United States Patent Office 2,711,380
Patented June 21, 1955

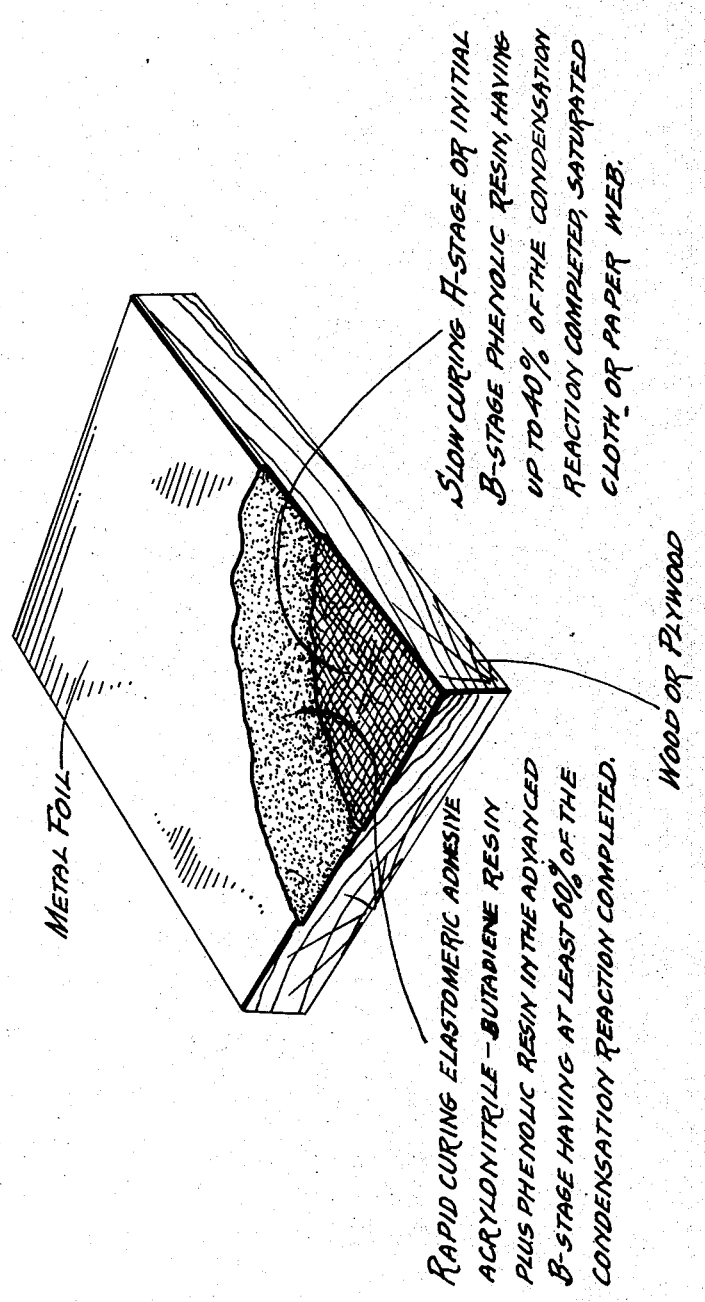

2,711,380

FOIL LAMINATE

Milton H. Pintell, Richmond, Va., assignor to Reynolds Metals Company, Richmond, Va., a corporation of Delaware Application November 7, 1952, Serial No. 319,426

3 Claims. (Cl. 154—45.9)

This invention relates to laminate structures made from a metal foil and a cellulosic sheet or web as well as to foil-paper-wood laminates permanently secured together.

It is an object of this invention to provide a laminate sheet including and adapted to bond a layer of metal foil, particularly aluminum foil, to plywood and other wood surfaces or faces, which will have universal use not withstanding the porosity or lack of substantial porosity of the wood, and which is adapted to be strongly bonded to said wood by the application of heat and pressure.

A further object of the invention is to enable the use of embossed metal foil laminate as the wood covering layer in such a manner that adequate heat and pressure may be used to bond the foil to the wood while maintaining the embossed surface.

A further object of the invention, pertinent to the last stated object, is the reinforcement of the embossed laminate by a like embossed underlying sheet which consists of a major content of adhesive and a minor content of cellulosic fibers.

A further object of the invention is to reduce the cost of the laminated product by overcoming problems incident to the use of two different adhesive mediums, the invention resulting in a compatible interaction between the high cost adhesive directly applied to the foil and a low cost adhesive which impregnates the cellulosic fiber, both adhesives being condensed and adapted to be cured under the application of heat and pressure during the application of the laminate to a wood surface.

These and other objects will become apparent upon reading the following disclosure.

This application is a continuation in part of Serial No. 109,410 filed August 9, 1949, now abandoned.

The drawing is a perspective view showing an embodiment of the invention, broken away in part.

According to this invention a metal foil, which may be smooth or embossed, for example, aluminum foil, is secured to a cellulosic web or layer, for example, paper or a cotton web by means of an elastomeric adhesive comprising a acrylonitrile-butadiene resin and a phenolic resin, said cellulosic layer being treated, preferably saturated with phenolic resin, said elastomeric adhesive being in such a stage of condensation so as to effect a faster curing than the curing of the phenolic resin in the cellulosic layer whereby heat curing takes place first in elastomeric adhesive, and only then, i. e. secondarily, does the curing of the phenolic resin in the cellulosic layer take place.

The cellulosic layer may be disposed against a layer of wood during the curing of the aluminum foil adhesively secured to paper laminate so that curing of the laminate effects a union of the paper layer to its adjacently disposed layer of wood.

The phenolic resin in the elastomeric resin adhesive must be a partially cured resin in the advanced B stage of condensation, but the phenolic resin of the cellulosic or paper layer may be in the A stage or initial B stage. These A and B stages of phenolic condensation are well known in the art and therefore need not be further elucidated herein.

The term "partially cured resin" as used herein means a resin that is solvent soluble, for example, in methyl ethyl ketone and in other solvents used for dissolving said resin prior to application. The term "advanced B state of phenolic condensation" as used herein, means such a degree of condensation that at least 60% of the condensation or curing reaction has been completed. The term "initial B stage of condensation" as used herein means a phenolic resin having such a degree of condensation or cure, that up to 40% of the condensation reaction has been completed.

The uses of this invention are many, such as: burnproofing of wooden furniture and other combustible solids; burnproofing of otherwise burnable laminates, such as, plywood; enhancing the value of knot prevalent wood by giving it a permanently secured metal facing thereby concealing the knots; barrier laminate stock to impede passage of fluid material, e. g. in cooperage staves, wood tanks, wood piping, etc.; improved rigidity of single wood plyfoil laminates; prevention of grain raising by use of a foil laminate backing to prevent passage of moisture into a layer of grained wood, etc.

The adhesive of the laminate will withstand high humidity and even contact with water for prolonged periods of time. Thus the foil laminate of this invention is suitable for use in the construction of boats, because the metal resists water and the adhesive at the juncture of the panels itself is extremely resistant to water penetration.

The adhesive of this invention is adapted to set at the relatively high temperatures common to the hot press plywood industry. The use of such an adhesive permits the foil laminates to be removed from the presses while still hot. The adhesive is thermosetting in character and thus will permit the removal of a hot laminated panel after the time interval required to cure the adhesive.

The use of thermoplastic adhesive in the plywood industry has many disadvantages, e. g. cellulose nitrate is susceptible to ignition, while other thermoplastics are objectionable because they have poor resistance to the high temperatures employed during the hot pressing step.

By this invention a strong and uniform bond is effected between the metal foil and the paper or other cellulosic web such as woven textile material. Conventional adhesives for foil, such as the vinyl chloracetate polymers, acrylic, or methacrylic acid esters are incompatible with and not suitable for bonding to a phenolic resin saturated cellulosic web or backing.

Also according to this invention, the phenol-formaldehyde resin concentration of the saturated cellulosic web ranges from about 30% to about 70% of the total weight of the treated web or paper. When the foil laminate having a paper or cellulosic web saturated with phenolic resin is placed against a flat wood surface and molded thereto, a considerable amount of the phenolic resin migrates from the paper into the pores of the wood. The acrylo-nitrile butadiene thermosetting adhesives of this invention provide for such a rate of thermosetting that it is substantially faster than the setting or curing of the phenolic resin in the paper layer, thereby preventing migration of the acrylo-nitrile butadiene resin into the paper or cellulosic web during the hot pressing of the foil-paper laminate to a wood foundation, core, or backing. Thus, this invention provides for an adhesive having thermosetting properties, disposed between a metal foil and a phenolic resin saturated cellulosic web, and further having a substantially faster cure than the phenolic resin disposed in the cellulosic web. Further, the resin compositions of this invention are adapted to liberate solvents without any substantial residue of volatiles remaining after application, thereby preventing "blows" beneath the impervious foil due to volatization of volatiles during the hot pressing of the laminate.

Examples of the thermosetting adhesive compositions used between the foil and the phenolic resin are:

Example No. 1:

| | Per cent by weight |
|---|---|
| Acrylonitrile-butadiene polymer (18% acrylonitrile–82% butadiene) | 21.25 |
| Phenol-formaldehyde resin | 20.50 |
| Phenylbeta napthylamine | .75 |
| Isopropoxy diphenylamine | .50 |
| Diphenylpara phenylene diamine | .50 |
| Methyl ethyl ketone | 56.50 |
| | 100.00 |

The amine constituents of this formula are used both to stabilize the viscosity of the initial adhesive solution and to provide resistance to atmospheric oxidation to the acrylonitrile butadiene co-polymer.

Example No. 2:

| | Per cent by weight |
|---|---|
| Acrylonitrile-butadiene polymer (26% acrylonitrile–74% butadiene) | 22.25 |
| Phenol formaldehyde resin | 20.00 |
| Monophenyl diortho xenyl phosphate | 4.25 |
| Phenylbeta napthylamine | .75 |
| Isopropoxy diphenylamine | .75 |
| Diphenylpara phenylenediamine | .50 |
| Methyl ethyl ketone | 51.50 |
| | 100.00 |

Example No. 3:

| | Per cent by weight |
|---|---|
| Acrylonitrile-butadiene polymer (35% acrylonitrile–65% butadiene) | 25.50 |
| Phenol-formaldehyde resin | 21.25 |
| Monoheptyl diphenylamine | .50 |
| Diheptyl diphenylamine | 1.25 |
| Methyl ethyl ketone | 51.50 |
| | 100.00 |

Example No. 4 (illustrating high acrylonitrile-butadiene polymer ratio to low phenol-formaldehyde resin component):

| | Per cent by weight |
|---|---|
| Acrylonitrile-butadiene polymer (26% acrylonitrile–75% butadiene | 26.25 |
| Phenol-formaldehyde resin | 5.50 |
| Monophenyl diortho xenyl phosphate | 1.75 |
| Di-beta naphthyl-para phenylenediamine | 1.75 |
| Methyl ethyl ketone | 64.75 |
| | 100.00 |

In Examples 2 and 4 monophenyl diortho xenyl phosphate is used as a plasticizer to effect better compatibility between the phenolic resin and the acrylonitrile butadiene co-polymer.

Example No. 5 (illustrating high phenol-formaldehyde resin ratio to low acrylonitrile-butadiene polymer component):

| | Per cent by weight |
|---|---|
| Phenol-formaldehyde resin | 24.75 |
| Acrylonitrile-butadiene polymer (35% acrylonitrile–65% butadiene) | 6.00 |
| Tricresyl phosphate | 1.25 |
| Monoheptyl diphenylamine | .75 |
| Diheptyl diphenylamine | 1.00 |
| Methyl ethyl ketone | 66.25 |
| | 100.00 |

Example No. 6 (illustrating the use of low proportion of phenolic resin and addition of thermionic carbon black to reduce moisture absorption of adhesive, when abnormally high water resistance is necessary):

| | Per cent by weight |
|---|---|
| Acrylonitrile-butadiene polymer (26% acrylonitrile–64% butadiene) | 22.75 |
| Phenol formaldehyde resin | 20.50 |
| Thermionic carbon black | 6.25 |
| Monophenyldiortho xenyl phosphate | 3.25 |
| Phenylbeta naphthylamine | .25 |
| Isopropoxy diphenylamine | .50 |
| Diphenylpara phenylenediamine | .25 |
| Methyl ethyl ketone | 46.25 |
| | 100.00 |

The formula of Example 6 is particularly adapted for use in foil laminates used in the construction of boats. This formula contains thermionic carbon black to further reduce the moisture adsorption of the thermosetting adhesive. Channel blacks are usable in lieu of thermionic blacks but are not preferred because of their inferior characteristic relative to resistance to moisture pick-up.

In preparing the thermosetting adhesive used to unite the metal foil to the phenolic saturated cellulosic web, the acrylonitrile butadiene co-polymer is dissolved in the solvent, e. g. methyl ethyl ketone, together with any viscosity stabilizers and plasticizers used in the formula. Next, the phenolic resin is added to the prepared solution and mechanically mixed to effect complete solution.

Dissolving of all the solid components simultaneously in the methyl ethyl ketone may effect an undesirably high temperature, sufficiently elevated to deleteriously effect the curing property of the phenolic resin used in conjunction with the acrylonitrile butadiene co-polymer. However, simultaneous solution of the dissolvable components in the methyl ethyl ketone is feasible if adequate cooling is provided to prevent an undesirable rise in temperature.

Where thermionic black constitutes a part of the formula, the black solid material is first milled into the acrylonitrile butadiene co-polymer and then dissolved in the solvent.

The thermosetting adhesive is applied in the form of a solution to the metal foil, for example, aluminum foil and thereupon the solvent is allowed to completely evaporate at a temperature sufficiently low so as not to effect the curing properties of the adhesive.

Clearly, this invention comprises adhesively joining a metal foil to a phenolic resin treated paper sheet using a thermosetting adhesive, and thereafter bonding said foil adhered paper to a wood layer, thereby effecting a first thermoset bond between the foil and the phenolic resin treated paper and a second thermoset bond between the phenolic resin treated paper and the wood, in one hot press operation, the curing of the thermosetting adhesive being effected prior to that of the phenolic resin which joins the paper to the wood layer. In short there is a consecutive curing of the over-all laminate in the hot press, i. e. first the curing of the adhesive thermosetting resin disposed between the metal foil and the paper layer, and secondly between the phenolic resin treated paper layer and wood layer.

Having described my invention, what I claim and desire to secure by Letters Patent is as follows:

1. A laminate structure comprising metal foil, a partially cured phenolic resin saturated paper layer, a thermosetting adhesive comprising acrylonitrile butadiene co-polymer and a phenolic resin in more advanced stage of condensation and disposed between said foil and said paper layer, said laminate being adapted to be heat cured in a single hot pressing operation with the curing of thermosetting adhesive being effected prior to the curing of the phenolic resin of the paper layer.

2. A cured laminate structure comprising a metal foil, a phenolic resin saturated paper layer, a thermoset acrylonitrile butadiene resin plus phenolic resin adhesive layer permanently bonding said foil to said paper, and a wood layer disposed beneath said paper layer and permanently phenolic resin bonded to said phenolic resin saturated paper layer.

3. As an article of manufacture, a foil laminate consisting of a metal foil, a layer of rapid curing elastomeric adhesive acrylonitrile butadiene resin containing phenolic resin having at least 60% completion of the condensation reaction adhered to said foil, and a paper web saturated with slow curing phenolic resin having up to 40% completion of the condensation reaction.

References Cited in the file of this patent

UNITED STATES PATENTS

| | | |
|---|---|---|
| 2,376,854 | Saunders et al. | May 22, 1945 |
| 2,415,881 | Heftler | Feb. 18, 1947 |
| 2,418,233 | McClary | Apr. 1, 1947 |
| 2,479,342 | Gibbons et al. | Aug. 16, 1949 |

FOREIGN PATENTS

| | | |
|---|---|---|
| 569,666 | Great Britain | June 4, 1945 |